United States Patent [19]

Zolk et al.

[11] Patent Number: 5,006,620

[45] Date of Patent: * Apr. 9, 1991

[54] PREPARATION OF HOMOPOLYMERS AND COPOLYMERS OF PROPENE BY MEANS OF A ZIEGLER-NATTA CATALYST SYSTEM

[76] Inventors: Ralf Zolk, 7 Weinbietstrasse, 6714 Weisenheim; Juergen Kerth, 15 Wattenheimer Strasse, 6719 Carlsberg; Rainer Hemmerich, 9 Veilchenweg, 6718 Gruenstadt, all of Fed. Rep. of Germany

[ * ] Notice: The portion of the term of this patent subsequent to Aug. 15, 2006 has been disclaimed.

[21] Appl. No.: 400,350

[22] Filed: Aug. 30, 1989

[30] Foreign Application Priority Data

Aug. 31, 1988 [DE] Fed. Rep. of Germany ....... 3829519

[51] Int. Cl.$^5$ ...................... C08F 4/648; C08F 4/654; C08F 4/656
[52] U.S. Cl. .................................... 526/128; 502/125; 526/125; 526/129; 526/351; 526/909
[58] Field of Search ................................ 526/129, 128

[56] References Cited

U.S. PATENT DOCUMENTS

| | | | |
|---|---|---|---|
| 4,115,319 | 9/1978 | Scata et al. | 526/142 |
| 4,442,224 | 4/1984 | Takitani et al. | 526/142 |
| 4,857,613 | 8/1989 | Zolk et al. | 526/351 |

FOREIGN PATENT DOCUMENTS

| | | |
|---|---|---|
| 0014523 | 8/1980 | European Pat. Off. . |
| 0195497 | 9/1986 | European Pat. Off. . |
| 0171200 | 12/1986 | European Pat. Off. . |
| 0045977 | 7/1987 | European Pat. Off. . |
| 2101609 | 1/1983 | United Kingdom . |
| 2101611 | 1/1983 | United Kingdom . |

*Primary Examiner*—Edward J. Smith
*Attorney, Agent, or Firm*—Keil & Weinkauf

[57] ABSTRACT

Polymers of propene are prepared by means of a Ziegler-Natta catalyst system composed of (1) a titanium component based on a finely divided shape-dictating silica gel and containing titanium, magnesium, chlorine and a benzenecarboxylic acid derivative, (2) an aluminum component and (3) a silane component, the titanium component (1) being obtained by (1.1) first preparing (I) a carrier material from (Ia) a silica gel, (Ib) an organomagnesium compound (Ic) a gaseous chlorinating agent and (Id) a specific phthalic acid derivative by (1.1.1) first reacting (Ia) with (Ib), then (1.1.2) passing (Ic) into the product of (1.1.1) together with the phthalic acid derivative (Id) and isolating (I), (1.2) preparing a solid-phase intermediate from (I), (II) an alkanol and (III) titanium tetrachloride by (1.2.1) first reacting (I) with (II), then (1.2.2) introducing (III) into the product resulting from (1.2.1), then (1.3) extracting the solid-phase result from (1.2) with titanium tetrachloride or a titanium tetrachloride/ethylbenzene mixture, and finally (1.4) washing the solid-phase result from (1.3) with a liquid hydrocarbon.

3 Claims, No Drawings

PREPARATION OF HOMOPOLYMERS AND COPOLYMERS OF PROPENE BY MEANS OF A ZIEGLER-NATTA CATALYST SYSTEM

The present invention relates to a process for preparing homopolymers of propene and copolymers of propene with minor amounts of other $C_2$–$C_{12}$-, in particular $C_2$–$C_6$-, α-monoolefins by polymerization, in particular by dry phase polymerization, of the monomer(s) at from 20° to 160 °C., in particular at from 50° to 120° C., under from 1 to 100, in particular from 10 to 70, bar by means of a Ziegler-Natta catalyst system composed of
(1) a titanium component based on a finely divided shape-dictating silica gel and containing titanium, magnesium, chlorine and a benzenecarboxylic acid derivative,
(2) an aluminum component of the formula $$AlR_3$$

where
R is alkyl of not more than 8, in particular not more than 4, carbon atoms, and
(3) a silane component of the formula $$R_n^1 Si(OR^2)_{4-n}$$

where
$R^1$ is saturated aliphatic or aromatic hydrocarbyl of not more than 16, preferably not more than 10, carbon atoms,
$R^2$ is alkyl of not more than 15, preferably not more than 8, in particular not more than 4, carbon atoms, and
n is from 0 to 3, preferably from 0 to 2, in particular 1 or 2,
with the provisos that the atomic ratio of titanium of titanium component (1) : aluminum of aluminum component (2) is from 1:10 to 1:800, in particular from 1:20 to 1:200, and the molar ratio of aluminum component (2): silane component (3) is from 1:0.01 to 1:0.8, in particular from 1:0.02 to 1:0.5.

Polymerization processes of this type are known; they are distinguished from other similar processes by the specific form of the catalyst system, the prototypes for which may be considered to be the catalyst systems of the processes disclosed in European Patent Applications EP-A-0,014,523, -0,045,977, -0,171,200 and -0,195,497 and British Patents GB-B-2,101,609 and -2,101,611.

The specific forms of the catalyst systems are chosen with certain purposes in mind, such as the following:

The catalyst system should be easily preparable and give a high yield of a polymer product which should ideally have a high isotactic index. The catalyst system should in addition produce polymers having specific morphological properties, for example a uniform particle size and/or a reduced level of fines and/or a high bulk density. In addition to these parameters, which chiefly concern the control of the polymerization system, the workup of the polymers and/or the processing thereof, another important objective, in particular in respect of corrosion problems, is a low halogen content of the polymer, this being obtainable by increasing the polymer yield and/or by means of a catalyst system having a very low halogen content.

Some of these objectives are obtainable in the prior art only by very complicated processes or by assigning a lower priority to other objectives:

For instance, European Patent Application EP-A-0,045,977 describes a catalyst system consisting of active $MgCl_2$, $TiCl_4$ and a phthalic acid derivative. However, with silica gel as the shape-dictating carrier material the productivity of the catalyst system is no longer satisfactory; moreover, the chlorine content of the polymer is comparatively high.

European Patent Applications EP-A-0,014,523 and -0,171,200 and British Patents GB-B-2,101,609 and -2,101,611 describe catalyst systems whose titanium component is obtained by treating a solid inorganic oxide with an organic magnesium compound, a Lewis base and titanium tetrachloride using in addition a halogenating agent other than titanium tetrachloride and/or an organic compound of the metals boron, aluminum, silicon or tin, a boron trihalide or a halogen-containing alcohol. Despite the costly and time-intensive procedure, the productivity of the corresponding catalyst system is not satisfactory.

European Patent Application EP-A-0,195,497 describes a catalyst system whose titanium component is obtained by treating $SiO_2$ with an organic Mg compound, an alcohol, a Lewis base and $TiCl_4$. This catalyst system likewise has a low productivity.

The existing processes thus leave something to be desired, in particular as regards good productivity and a low chlorine content of the polymer combined with high isotacticity and good morphology.

It is an object of the present invention to provide a titanium component which compared with the prior art processes show particularly good productivity while giving polymers of low chlorine content, high isotacticity and good morphology.

We have found that this object is achieved by a catalyst system containing a titanium component (1) prepared in a particular manner from (I) a specific carrier material obtained in a defined manner from (Ia) a specific finely divided silica gel, (Ib) a specific organomagnesium compound (Ic) a specific gaseous chlorinating agent and (Id) a specific phthalic acid derivative, (II) a specific alkanol, and (III) titanium tetrachloride.

The present invention accordingly provides a process for preparing a homopolymer of propene or a copolymer of propene with a minor amount of another $C_2$–$C_{12}$-, in particular $C_2$–$C_6$-, α-monoolefin by polymerization, in particular by dry phase polymerization, of the monomer(s) at from 20° to 160° C., in particular at from 50 to 120° C., under from 1 to 100, in particular from 20 to 70, bar by means of a Ziegler-Natta catalyst system composed of
(1) a titanium component based on a finely divided shape-dictating silica gel and containing titanium, magnesium, chlorine and a benzenecarboxylic acid derivative,
(2) an aluminum component of the formula $$AlR_3$$

where
R is alkyl of not more than 8, in particular not more than 4, carbon atoms, and
(3) a silane component of the formula $$R_n^1 Si(OR^2)_{4-n}$$

where $R^1$ is saturated aliphatic or aromatic hydrocarbyl of not more than 16, preferably not more than 10, carbon atoms, $R^2$ is alkyl of not more than 15, preferably not more than 8, in particular not more than 4, carbon atoms, and n is from 0 to 3, preferably from 0 to 2, in particular 1 or 2, with the provisos that the atomic ratio of titanium of titanium component (1) : aluminum of aluminum component (2) is from 1:10 to 1:800, in particular from 1:20 to 1:200, and the molar ratio of aluminum component (2) : silane component (3) is from 1:0.01 to 1:0.8, in particular from 1:0.02 to 1:0.5, which comprises using as the titanium component (1) a titanium component obtained by first of all (1.1) preparing in a first stage (I) a carrier material from (Ia) a finely divided silica gel having a particle diameter of from 1 to 1,000, in particular from 10 to 400, μm, a pore volume of from 0.3 to 5, in particular from 1 to 3.5, cm$^3$/g, a surface area of from 100 to 1,000, in particular from 200 to 600, m$^2$/g, the formula $SiO_2.aAl_2O_3$, where a is from 0 to 2, in particular from 0 to 0.5, (Ib) an organomagnesium compound of the formula $MgR^3R^4$, where $R^3$ and $R^4$ are each $C_2$-$C_{10}$-alkyl, preferably $C_4$-$C_8$-alkyl, (Ic) a gaseous chlorinating agent of the formula ClZ, where Z is Cl or H, preferably H, and (Id) a phthalic acid derivative of the formula

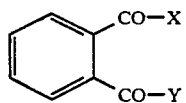

where X and Y together are oxygen or singly chlorine or $C_1$-$C_{10}$-alkoxy, preferably $C_2C_8$-alkoxy, in particular butoxy, by first (1 1.1) bringing together in a first substage in a liquid inert hydrocarbon, in particular an alkane, with constant mixing at room temperature the finely divided silica gel (Ia) and the organomagnesium compound (Ib) by using per 10 molar parts of silicon of silica gel (Ia) from 1 to 10, in particular from 1.5 to 4, molar parts of the organomagnesium compound (Ib), and keeping the mixture at from 20° to 140° C., in particular from 60° to 90° C., for from 0.5 to 5, in particular from 1 to 2, hours, then (1.1.2) introducing into the product obtained from the first substage in a second substage with constant mixing at from −20° to +80° C., in particular from 0° to +20° C., (i) the gaseous chlorinating agent (Ic) using from 2 to 40, in particular from 10 to 20, molar parts of chlorinating agent (Ic) per molar part of organomagnesium compound (Ib), and (ii) the phthalic acid derivative (Id) using per molar part of organomagnesium compound (Ib) from 0.01 to 1, preferably from 0.1 to 0.4, in particular from 0.20 to 0.35, molar parts of phthalic acid derivative (Id) leaving the whole mixture at a temperature within the stated range for from 0.5 to 5, in particular from 0.5 to 1, hours and, where appropriate, isolating the resulting solid-phase product, i.e. the carrier material (I), by removing the liquid phase, and then (1.2) preparing in a second stage a solid-phase intermediate from (I) the carrier material obtained in the first stage, (II) a $C_1$-$C_8$, preferably $C_2$-$C_6$-alkanol, in particular ethanol, and (III) titanium tetrachloride by first (1.2.1) bringing together in a first substage in a liquid inert hydrocarbon, in particular an alkane, with constant mixing at room temperature the carrier material (I) and the alkanol (II) using from 1 to 5, in particular from 2.5 to 3.5, molar parts of alkanol (II) per molar part of magnesium of carrier material (I), and keeping the mixture at from 20° to 140° C., in particular from 70° to 90° C., for from 0.5 to 5, in particular from 1 to 2, hours, then (1.2.2) in a second substage introducing the titanium tetrachloride (III) with constant mixing at room temperature into the reaction mixture resulting from the first substage using from 2 to 20, in particular from 4 to 8, molar parts of titanium tetrachloride (III) per molar part of magnesium of carrier material (I), keeping the mixture at from 10° to 150° C., in particular from 90° to 120° C., for from 0.5 to 5, in particular from 1 to 2, hours and isolating the resulting solid-phase intermediate by removing the liquid phase, then (1.3) in a third stage subjecting the solid-phase intermediate obtained from the second stage at from 100° to 150° C., in particular from 115° to 135° C., for from 0.2 to 8, in particular from 1 to 6, hours to a single- or multi-stage or preferably continuous extraction with titanium tetrachloride or a mixture of titanium tetrachloride and an ethylbenzene 10, whose titanium tetrachloride content is not less than 2, preferably not less than 5, in particular not less than 10% by weight, using for every 10 parts by weight of the solid-phase intermediate obtained from the second stage a total of from 10 to 1,000, preferably from 20 to 800, in particular from 50 to 300, parts by weight of extractant, and finally (1.4) in a fourth stage washing the solid-phase product formed in the third stage one or more times with a liquid inert hydrocarbon, in particular an alkane, and so obtaining titanium component (1). We have found that the process according to the invention can be practiced particularly successfully if the catalyst system used has a silane component (3) of the formula

where $R^1$ is phenyl, $C_1$-$C_4$-alkylphenyl or $C_1$-$C_5$-alkyl, $R^2$ is alkyl of not more than 4 carbon atoms, in particular methyl or ethyl, and n is 1 or 2.

There now follow specifics concerning the process according to the invention:

The polymerization process as such can be carried out in virtually any form customary in the art, for example as a batchwise, cyclic or, in particular, continuous process, whether for example as a suspension polymerization process or, in particular, as a dry phase polymerization process, as long as the novel feature is observed. The possible forms of the process, i.e. the technological versions of the polymerization of α-monoolefins by Ziegler-Natta, are well-known from theory and practice, so that they require no further observations.

For completeness it should be mentioned that in the process according to the invention it is also possible to regulate the molecular weights of the polymers in a conventional manner, for example by means of regulators, in particular hydrogen.

As regards the material side of the novel catalyst system, the details are as follows:

(1) Finely divided silica gel (Ia) to be used for preparing the titanium component will in general be an alumosilicate or in particular a silicon dioxide, as long as it has the required properties. We have found that the commercial carrier material silica gels which meet the stated specification are highly suitable.

The organomagnesium compound (Ib) to be used at the same time can be for example dibutylmagnesium, dihexylmagnesium or in particular butyloctylmagnesium.

The gaseous chlorinating agent (Ic) to be used should be very dry and pure; it comprises chlorine or in particular hydrogen chloride.

The above-defined phthalic acid derivative (Id) to be used can be of a commercial grade; it should advantageously be very pure. We have found that for the purposes of the present invention it is very particularly advantageous to use dibutyl phthalate; but it is also possible to use other dialkyl phthalates and phthalic anhydride or phthaloyl dichloride.

The liquid inert hydrocarbon assistant can be a hydrocarbon of the type customarily brought together with titanium components for catalyst systems of the Ziegler-Natta type without damage to the catalyst system or the titanium component thereof. Examples of suitable hydrocarbons are pentanes, hexanes, heptanes, gasolines and cyclohexane.

The alkanols (II) to be used for preparing the titanium component (1) can be of the type available commercially. They should advantageously have relatively high purities. It is highly advantageous to use for example ethanol or n-propyl, i-propyl, n-butyl, i-butyl or tert-butyl alcohols; it is particularly advantageous to use ethanol.

The titanium tetrachloride (III) likewise to be used for preparing the titanium component (1) should be of the customary type for Ziegler-Natta catalyst systems; the optional ethylbenzene for use in the mixture with titanium tetrachloride should be very pure and dry.

The hydrocarbon to be used in stage (1.4) of the preparation of titanium component (1) can likewise be of the customary type; it should advantageously be relatively pure.

The preparation of titanium component (1) is simple and possible for the skilled worker without instructions. All that needs to be added in respect of stages (1.1), (1.2) and (1.3) is that the solid resulting at each stage may advantageously be isolated by filtering off with suction.

(2) Suitable aluminum components (2) of the stated formula are the customary ones which conform to this formula; they are so well-known from theory and practice that no further details are required. An outstanding representative is for example triethylaluminum.

(3) The silane component (3) which completes the catalyst system is in particular a trialkoxy phenylsilane, a trialkoxy (alkyl), phenylsilane a dialkoxydiphenylsilane or a dialkoxydi (alkyl) phenylsilane of the stated formula. An outstanding representative is triethoxytoluylsilane; further examples are triethoxyethylphenylsilane, dimethoxyditoluylsilane and diethoxyditoluylsilane. Dialkoxydialkylsilanes and trialkoxyalkylsilanes are also highly suitable.

The process according to the invention makes it possible to prepare homopolymers and copolymers, for example of the binary or ternary type, including block copolymers, of propene with minor amounts of other $C_2$–$C_{12}$-$\alpha$-monoolefins in an advantageous manner, particularly suitable $\alpha$-monoolefin comonomers being ethene, 1-butene, 4-methyl-1-pentene and 1-hexene; but it is also possible to use for example n-1-octene, n-1-decene or n-1-dodecene.

EXAMPLE 1

Preparation of titanium component (1)

The procedure is that first (1.1) a carrier material is prepared in a first stage (I) from (Ia) a finely divided silica gel having a particle diameter of from 20 to 45 $\mu$m, a pore volume of 1.75 cm$^3$/g, a surface area of 320 m$^2$/g and the formula SiO$_2$, (Ib) butyloctylmagnesium, (Ic) hydrogen chloride and (Id) di-n-butyl phthalate by first (1.1.1) bringing together in a first substage in n-heptane with constant mixing by stirring at room temperature the finely divided silica gel (Ia) and the organomagnesium compound (Ib) using for every 10 molar parts of silicon of silica gel (Ia) 2.5 molar parts of the organomagnesium compound (Ib) and keeping the mixture at about 90° C. for 1.5 hours, then (1.1.2) in a second substage passing with constant mixing by stirring at about 10° C. into the mixture obtained from the first substage (i) the gaseous chlorinating agent (Ic) using for every molar part of organomagnesium compound (Ib) 10 molar parts of chlorinating agent (Ic) and (ii), five minutes after the start of the chlorination, the phthalic acid derivative (Id) using for the molar part of organomagnesium compound (Ib) 0.3 molar part of phthalic acid derivative (Id), keeping the whole mixture at a temperature within the stated range for 1.5 hours, and leaving the resulting solid-phase product, i.e. the carrier material (I) in the liquid phase, then (1.2) in a second stage preparing a solid-phase intermediate from (I) the carrier material obtained in the first stage, (II) ethanol and (III) titanium tetrachloride by first (1.2.1) in a first substage bringing together in n-heptane with constant mixing by stirring at room temperature the carrier material (I) and the ethanol (II) using 3 molar parts of ethanol (II) per molar part of magnesium of carrier material (I) and maintaining the mixture at about 80° C. for 1.5 hours, then (1.2.2) in a second substage introducing the titanium tetrachloride (III) with constant mixing by stirring at room temperature into the reaction mixture resulting from the first substage using 7 molar parts of titanium tetrachloride (III) per molar part of magnesium of carrier material (I), maintaining the mixture at about 100° C. for 2 hours with stirring, and isolating the resulting solid-phase intermediate by separating off the liquid phase by filtering with suction, then (1.3) in a third stage subjecting the solid-phase intermediate obtained from the second stage at 125° C. for 4 hours to a continuous extraction with a mixture of titanium tetrachloride and ethylbenzene having a titanium tetrachloride content of 15% by weight, using 100 parts by weight of titanium tetrachloride/ethylbenzene mixture for every 10 parts by weight of the solid-phase intermediate obtained from the second stage, then isolating the resulting solid-phase intermediate by filtration and finally (1.4) in a fourth stage washing the solid-phase product isolated in the third stage with n-heptane three times and so obtaining the titanium component (1); it contains 4.4% by weight of titanium, 6.5% by weight of magnesium and 27.5% by weight of chlorine.

Polymerization

A 10-1 capacity steel autoclave equipped with a stirrer is charged with 50 g of polypropylene powder, 10 mmol of aluminum triethyl (in the form of a 1-molar solution in n-heptane) as aluminum component (2), 1 mmol of triethoxyphenylsilane (in the form of a 1-molar solution in n-heptane) as silane component (3), 5 standard liters of hydrogen and finally 120 mg (0.11 mmol of titanium) of the above-described titanium component (1) at 30° C. The reactor temperature is raised to 70° C. in the course of 10 minutes, and the reactor pressure is raised to 28 bar at the same time by pressurization with gaseous propene.

The actual polymerization is carried out with constant stirring at 70° C. under 28 bar over 2 hours, during which consumed monomer is continuously replaced by fresh monomer.

The productivity of catalyst component (1), the heptane-soluble proportion (as a measure of the isotacticity) and the particle size distribution of the polymer obtained are shown in the Table below.

EXAMPLE 2

Example 1 is repeated, except that the silane component (3) used is the same molar amount of dimethoxyditoluylsilane.

The polymerization results thus obtained are again shown in the Table below.

COMPARISON

Preparation of titanium component

Example 1 of European Patent Application EP-A-0,195,497 is carried out.

The result is a titanium component which contains 3.6% by weight of titanium, 4.4% by weight of magnesium and 16% by weight of chlorine.

Polymerization

It is carried out as in Example 1 except that the titanium component described therein is replaced by the same molar amount of the comparative titanium component.

The polymerization results obtained are again shown in the Table below.

nents of the Examples according to the invention. In addition, the chlorine content of the polymer is significantly higher than in the cases according to the invention.

We claim:

1. A process for preparing a homopolymer of propene or a copolymer of propene with a minor amount of another $C_2$-$C_{12}$-$\alpha$-monoolefin by polymerization of the monomer(s) at from 20° to 160° C. under from 1 to 100 bar by means of a Ziegler-Natta catalyst system composed of
   (1) a titanium component based on a finely divided shape-dictating silica gel and containing titanium, magnesium, chlorine and a benzenecarboxylic acid derivative,
   (2) an aluminum component of the formula $$AlR_3$$

where
   R is alkyl of not more than 8 carbon atoms, and
   (3) a silane component of the formula $$R_n^1Si(OR^2)_{4-n}$$

where
   $R^1$ is saturated aliphatic or aromatic hydrocarbyl of not more than 16 carbon atoms,
   $R^2$ is alkyl of not more than 15 carbon atoms, and
   n is from 0 to 3,
with the provisos that the atomic ratio of titanium of titanium component (1) : aluminum of aluminum component (2) is from 1:10 to 1:800 and the molar ratio of aluminum component (2) : silane component (3) is from 1:0.01 to 1:0.8, which comprises using as the titanium component (1) a titanium component obtained by first of all
   (1.1) preparing in a first stage (I) a carrier material from (Ia) a finely divided silica gel having a particle diameter of from 1 to 1,000 μm, a pore volume of from 0.3 to 5 cm$^3$/g, a surface area of from 100 to 1,000 m$^2$/g, and the formula $SiO_2 \cdot aAl_2O_3$, where a is from 0 to 2, (Ib) an organomagnesium compound of the formula $MgR^3R^4$, where $R^3$ and $R^4$ are each $C_2$-$C_{10}$-alkyl, (Ic) a gaseous chlorinating agent of the formula ClZ, where Z is Cl or H, and (Id) a phthalic acid derivative of the formula

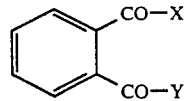

where X and Y together are oxygen or singly chlorine or $C_1$-$C_{10}$-alkoxy, by first
   (1.1.1) bringing together in a first substage in a liquid inert hydrocarbon with constant mixing at room temperature the finely divided silica gel (Ia) and the organomagnesium compound (Ib) by using per

|  | Productivity (g of PP/g of catalyst) | Heptane-soluble proportion (% by weight) | Particle size distribution (mm) | | | | | Chlorine content of product (ppm) |
|---|---|---|---|---|---|---|---|---|
|  |  |  | <0.25 | 0.25–0.5 | 0.5–1 | 1–2 | >2 |  |
| Example 1 | 13,400 | 2.3 | 1.3 | 4.4 | 64.6 | 29.5 | 0.1 | 20.5 |
| Example 2 | 15,600 | 1.6 | 1.1 | 3.8 | 50.3 | 44.5 | 0.3 | 17.6 |
| Comparison | 3,500 | 4.0 | 3.0 | 29.8 | 54 | 12.2 | 1.0 | 46 |

As can be seen from the Table, the catalyst component of the Comparison has a significantly lower productivity and stereospecificity than the catalyst compo- 10 molar parts of silicon of silica gel (Ia) from 1 to 10 molar parts of the organomagnesium compound (Ib), and keeping the mixture at from 20° to 140° C. for from 0.5 to 5 hours, then (1.1.2) introducing into the product obtained from the first substage in a second substage with constant mixing at from −20° to +80° C., (i) the gaseous chlorinating agent (Ic) using from 2 to 40 molar parts of chlorinating agent (Ic) per molar part of organomagnesium compound (Ib), and (ii) the phthalic acid derivative (Id) using per molar part of organomagnesium compound (Ib) from 0.01 to 1 molar parts of phthalic acid derivative (Id) leaving the whole mixture at a temperature within the stated range for from 0.5 to 5 hours and, (1.2) preparing in a second stage a solid-phase intermediate from (I) the carrier material obtained in the first stage, (II) a $C_1$–$C_8$-alkanol and (III) titanium tetrachloride by first (1.2.1) bringing together in a first substage in a liquid inert hydrocarbon with constant mixing at room temperature the carrier material (I) and the alkanol (II) using from 1 to 5 molar parts of alkanol (II) per molar part of magnesium of carrier material (I), and keeping the mixture at from 20° to 140° C. for from 0.5 to 5 hours, then (1.2.2) in a second substage introducing the titanium tetrachloride (III) with constant mixing at room temperature into the reaction mixture resulting from the first substage using from 2 to 20 molar parts of titanium tetrachloride (III) per molar part of magnesium of carrier material (I), keeping the mixture at from 10° to 150° C. for from 0.5 to 5 hours and isolating the resulting solid-phase intermediate by removing the liquid phase, then (1.3) in a third stage subjecting the solid-phase intermediate obtained from the second stage at from 100° to 150° C. for from 0.2 to 8 hours to a single- or multi-stage or continuous extraction with titanium tetrachloride or a mixture of titanium tetrachloride and an ethylbenzene whose titanium tetrachloride content is not less than 2%, using for every 10 parts by weight of the solid-phase intermediate obtained from the second stage a total of from 10 to 1,000 parts by weight of extractant, and finally (1.4) in a fourth stage washing the solid-phase product formed in the third stage one or more times with a liquid inert hydrocarbon and so obtaining titanium component (1).

2. A process as set forth in claim 1, wherein the catalyst system used has a silane component (3) of the formula $$R_n^1 Si(OR^2)_{4-n}$$

where
$R^1$ is phenyl, $C_1$–$C_4$-alkylphenyl or $C_1$–$C_5$-alkyl,
$R^2$ is alkyl of not more than 4 carbon atoms and
n is 1 or 2.

3. A process as set forth in claim 1, wherein solid carrier material (I) is isolated by removing liquid from the solid at the end of the first stage.

* * * * *

UNITED STATES PATENT AND TRADEMARK OFFICE
CERTIFICATE OF CORRECTION

PATENT NO. : 5,006,620
DATED : Apr. 9, 1991
INVENTOR(S) : Ralf ZOLK et al.

It is certified that error appears in the above-identified patent and that said Letters Patent is hereby corrected as shown below:

On the Cover Page:

Please insert

-- [73] Assignee: BASF Aktiengesellschaft
Ludwigshafen, Fed. Rep. of Germany
--

Signed and Sealed this

Fifteenth Day of September, 1992

*Attest:*

DOUGLAS B. COMER

*Attesting Officer*　　*Acting Commissioner of Patents and Trademarks*